(12) United States Patent
Matsui et al.

(10) Patent No.: US 7,187,821 B2
(45) Date of Patent: Mar. 6, 2007

(54) CARRIER SUPPRESSION USING ADIABATIC FREQUENCY MODULATION (AFM)

(76) Inventors: Yasuhiro Matsui, 101 River Pointe Way, Lawrence, MA (US) 01843; Daniel Mahgerefteh, 10620 Wilkins Ave., Los Angeles, CA (US) 90024

( * ) Notice: Subject to any disclaimer, the term of this patent is extended or adjusted under 35 U.S.C. 154(b) by 0 days.

(21) Appl. No.: 11/037,893

(22) Filed: Jan. 18, 2005

(65) Prior Publication Data

US 2006/0002717 A1    Jan. 5, 2006

Related U.S. Application Data

(63) Continuation-in-part of application No. 10/680,607, filed on Oct. 6, 2003, now Pat. No. 7,054,538, and a continuation-in-part of application No. 10/308,522, filed on Dec. 3, 2002, and a continuation-in-part of application No. 10/289,944, filed on Nov. 6, 2002, now Pat. No. 6,963,685.

(60) Provisional application No. 60/536,929, filed on Jan. 16, 2004.

(51) Int. Cl.
  *G02B 6/28* (2006.01)
  *H04B 10/04* (2006.01)
  *H04B 10/12* (2006.01)

(52) U.S. Cl. .................. 385/24; 398/185; 398/200
(58) Field of Classification Search .................. 385/14, 385/15, 27, 147, 24; 398/147, 185, 188, 398/194, 200
See application file for complete search history.

(56) References Cited

U.S. PATENT DOCUMENTS

| | | | |
|---|---|---|---|
| 4,561,119 A | 12/1985 | Epworth | |
| 4,805,235 A | 2/1989 | Henmi | |
| 5,416,629 A | 5/1995 | Huber | |
| 5,477,368 A * | 12/1995 | Eskildsen et al. | 398/147 |
| 5,920,416 A | 7/1999 | Beylat et al. | |
| 6,104,851 A | 8/2000 | Mahgerefteh | |
| 6,115,403 A | 9/2000 | Brenner et al. | |

(Continued)

FOREIGN PATENT DOCUMENTS

GB    2 107 147    4/1983

OTHER PUBLICATIONS

Lee, Chang-Hee et al., Transmission of Directly Modulated 2.5-Gb/s Signals over 250-km of Nondispersion-Shifted Fiber by Using a Spectral Filtering Method, IEEE Photonics Technology Letters, Dec. 1996, 1725-1727, vol. 8, No. 12.
Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.
Binder, J. et al., 10 Gbit/s-Dispersion Optimized Transmission at 1.55µm Wavelength on Standard Single Mode Fiber, IEEE Photonics Technology Letters, Apr. 1994, 558-560, vol. 6, No. 4.

(Continued)

*Primary Examiner*—John D. Lee
(74) *Attorney, Agent, or Firm*—Pandiscio & Pandiscio

(57) ABSTRACT

A method and system for suppression of the optical carrier of an optically modulated digital signal, the method comprising the steps of: modulating the amplitude of an optical carrier with digital input data to generate an amplitude modulated optical signal; and modulating the frequency of the optical carrier of the resulting optical signal with the same digital input data. A fiber optic system comprising: an optical source adapted to produce an adiabatically chirped amplitude modulated optical signal; an optical fiber adapted to receive the optical signal; and an optical receiver; wherein the optical power of the signal launched into the fiber exceeds the stimulated Brillouin threshold of the transmission fiber for a single frequency, continuous wave signal.

4 Claims, 14 Drawing Sheets

System configuration for AFM

U.S. PATENT DOCUMENTS

| | | |
|---|---|---|
| 6,298,186 B1 | 10/2001 | He |
| 6,331,991 B1 | 12/2001 | Mahgerefteh |
| 6,963,685 B2 | 11/2005 | Mahgerefteh et al. |
| 2004/0008933 A1 | 1/2004 | Mahgerefteh et al. |
| 2004/0096221 A1 | 5/2004 | Mahgerefteh et al. |
| 2004/0218890 A1 | 11/2004 | Mahgerefteh et al. |

OTHER PUBLICATIONS

Mohrdiek, et al., 10-Gb/s Standard Fiber Transmission Using Directly Modulated 1.55-μm Quantum-Well DFB Lasers, IEEE Photonics Technology Letters, Nov. 1995, 1357-1359, vol. 7, No. 11.

* cited by examiner

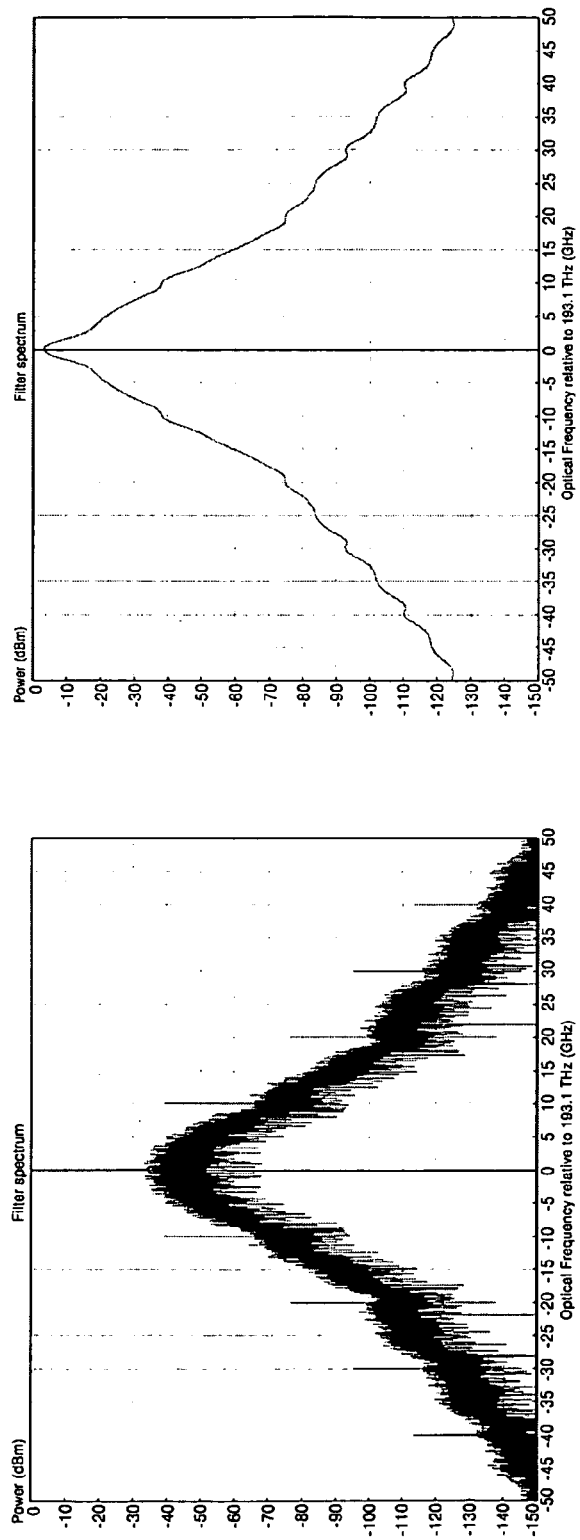
FIG. 1. Spectrum of AM modulation

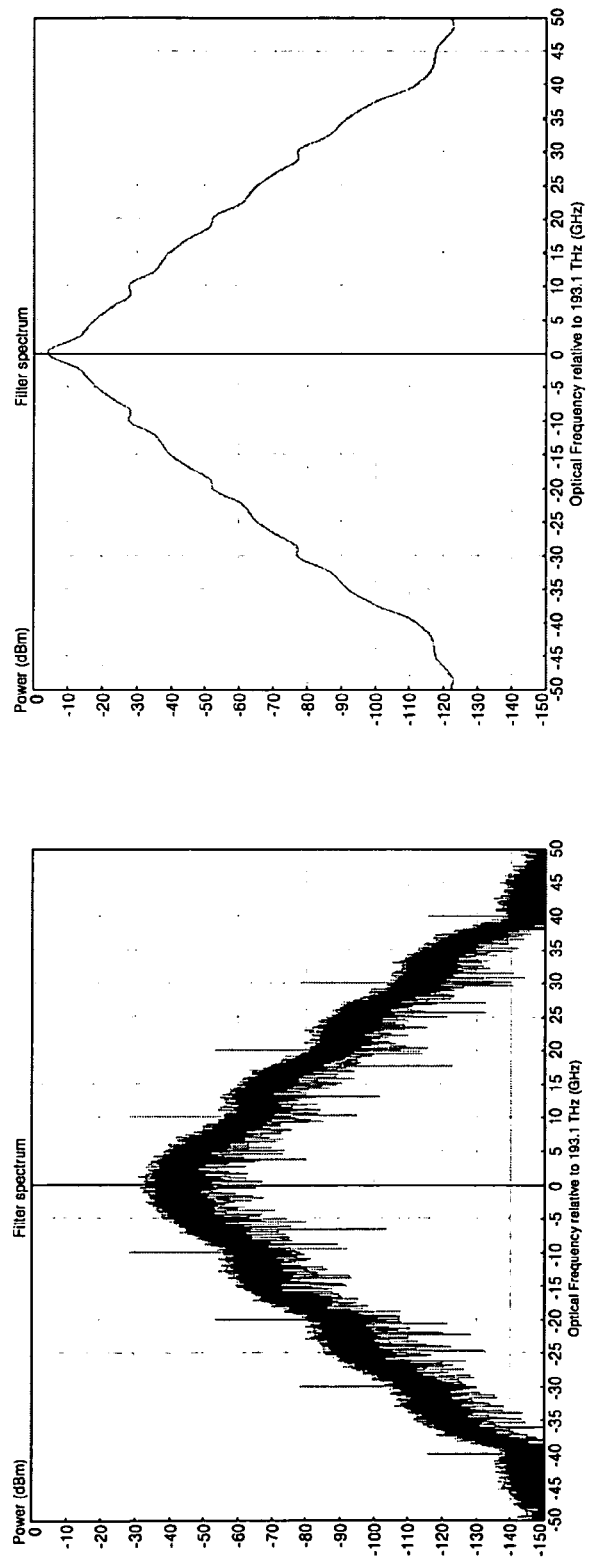
FIG. 2. Spectrum of AM modulation plus transient chirp. Carrier not removed.

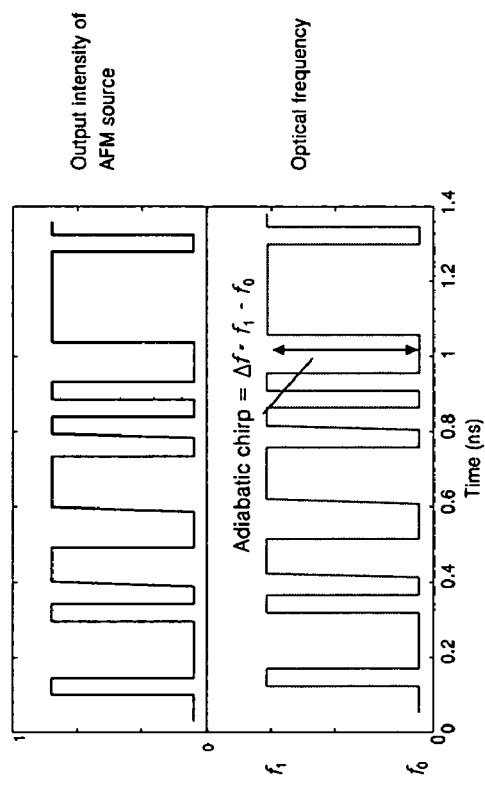
FIG. 3. Intensity and Frequency of a ACAM signal

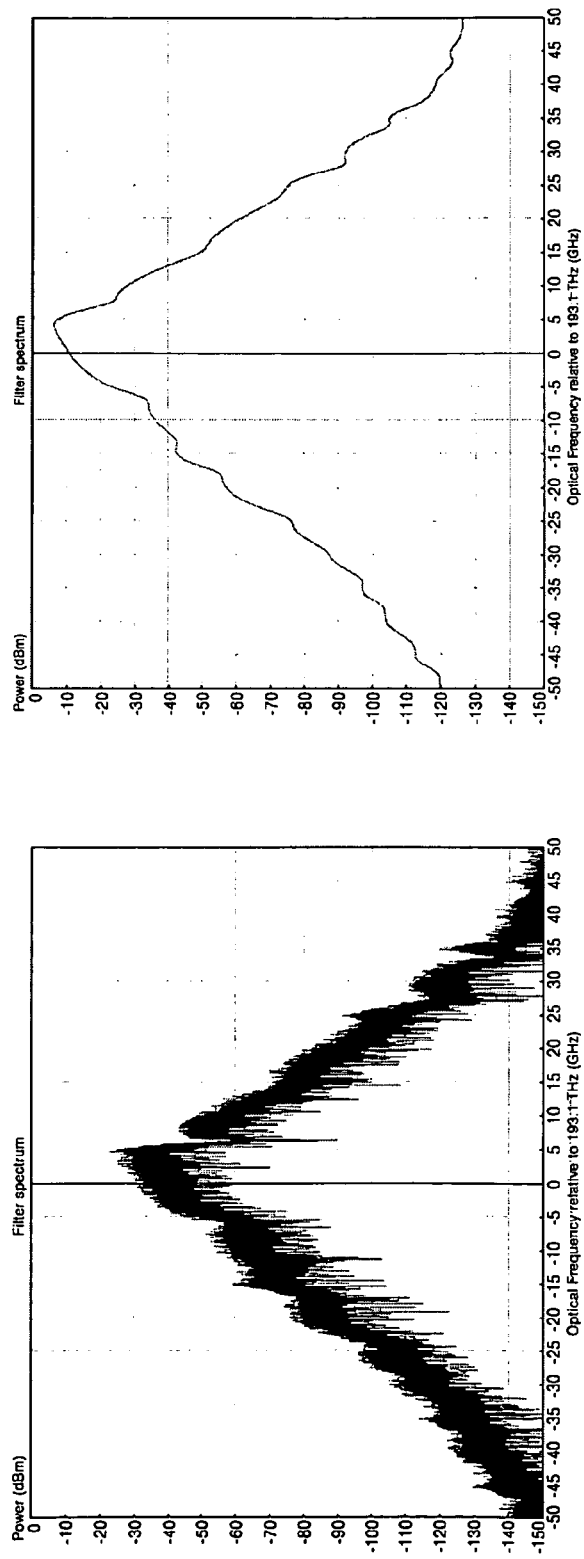
FIG. 4. Spectrum of an AMF signal does not have a carrier

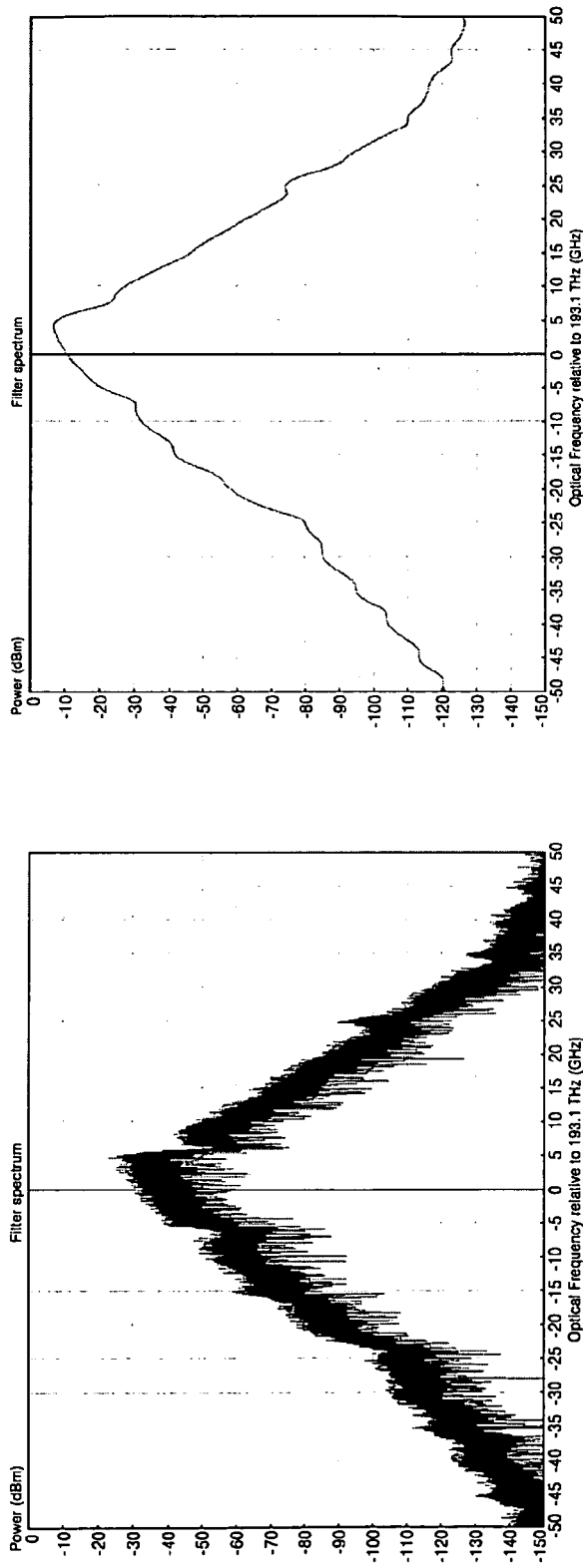
FIG. 5. AMF signal delay between AM and FM

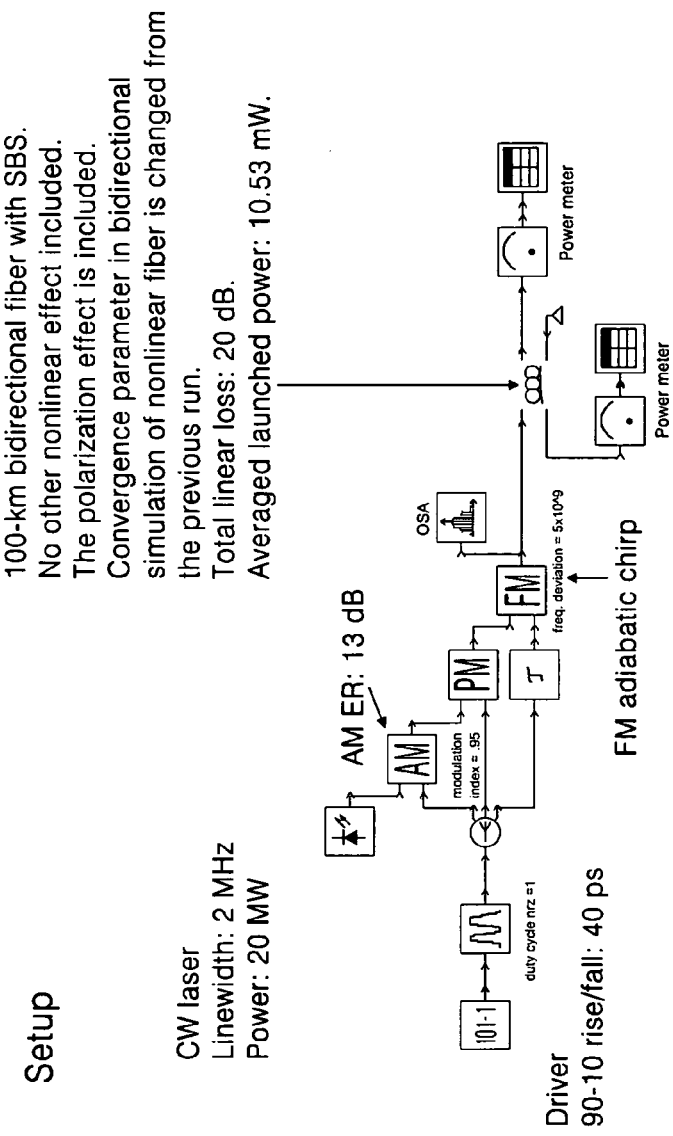
FIG. 6. System configuration for AFM

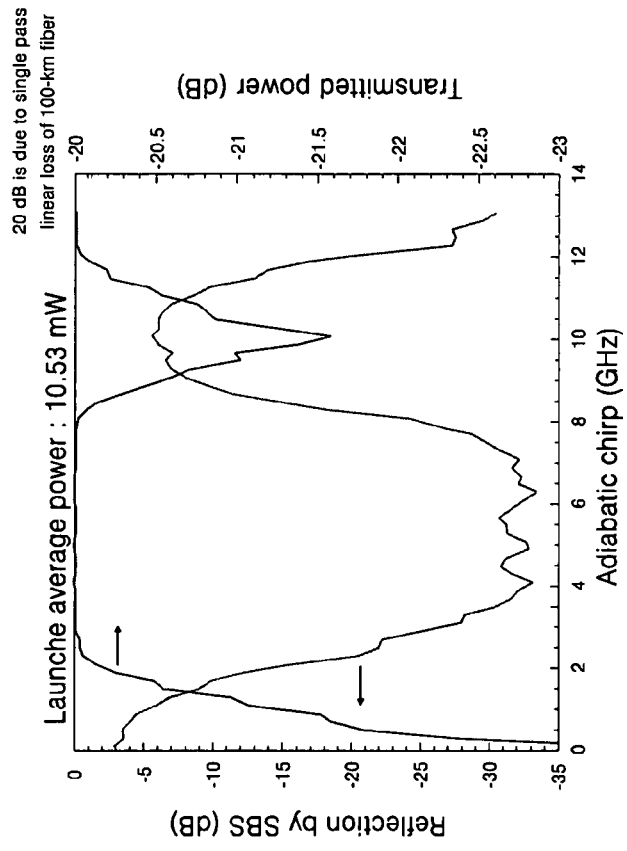
FIG. 7. Reflected power due to SBS is supressed for a range of adiabatic chirp values Carrier not suppressed for 10 G chirp at 10 Gb/s NRZ
Adiabatic chirp : 5 GHz
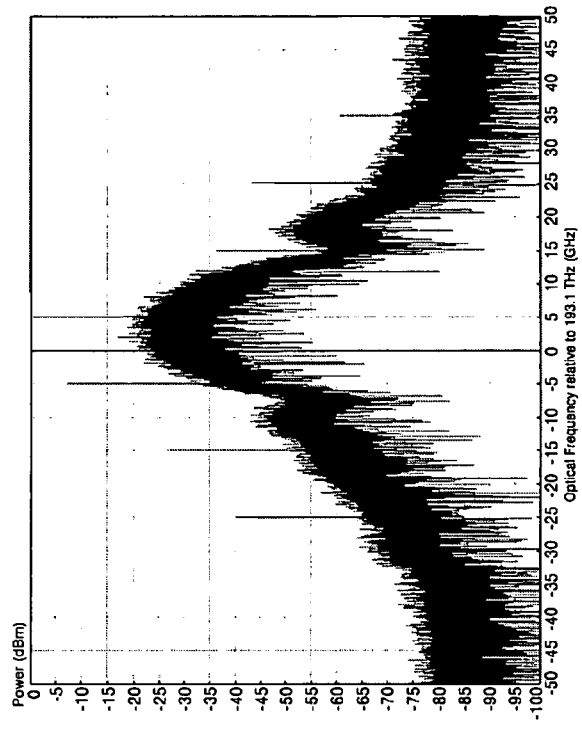
Adiabatic chirp : 10 GHz
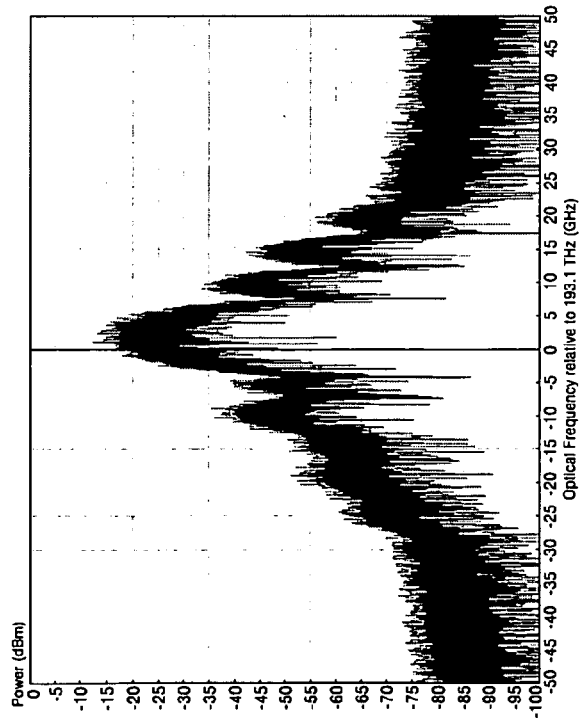
FIG. 8. Carrier is not suppressed for a 10 GHz/NRZ modulation and a 10 GHz of chirp

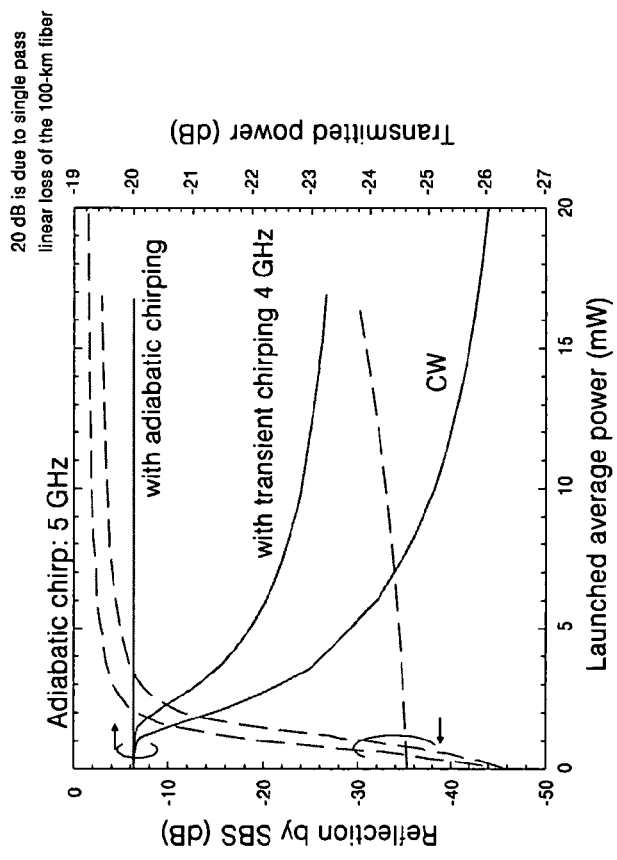
FIG. 9. Comparison of tolerance to SBS for CW laser, modulated with transient chirp, and AFM source with 5 GHz chirp

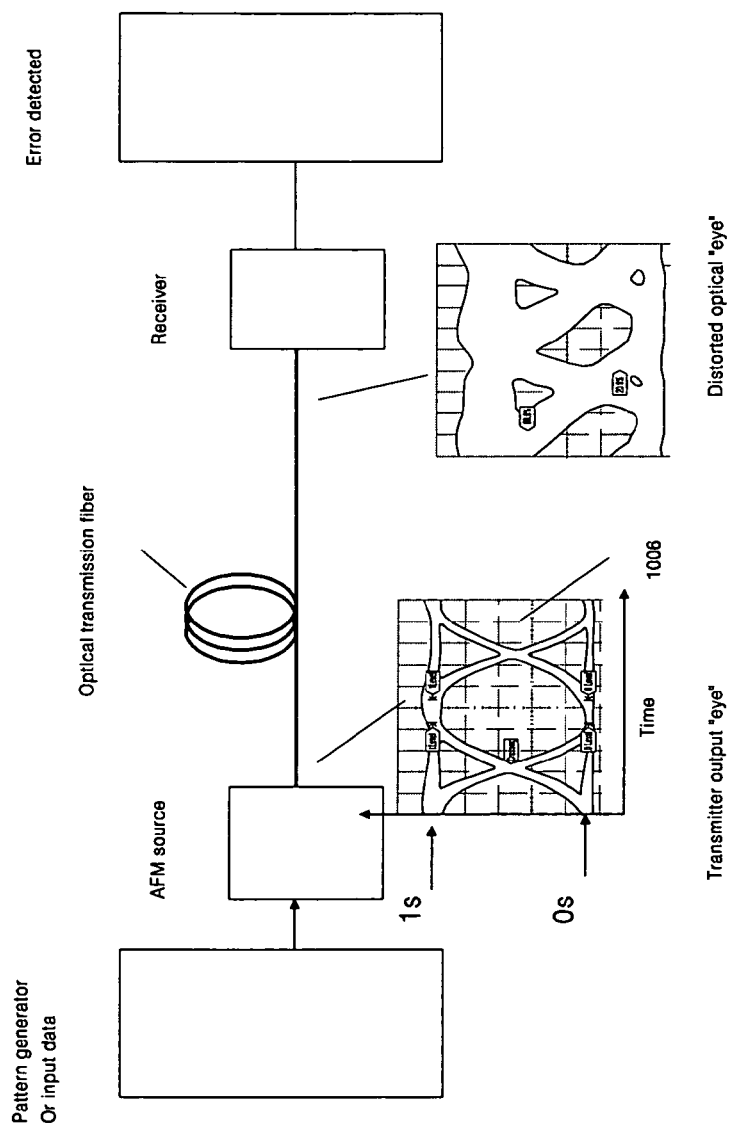
FIG. 10. Transmission system with AFM source, fiber, standard intensity modulation receiver and decision circuit

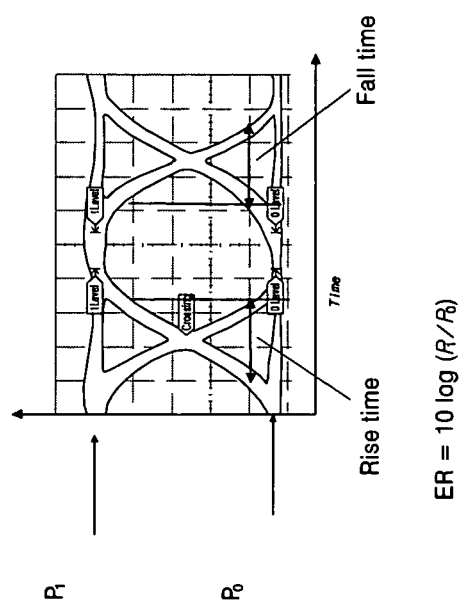
FIG. 11. Optical eye diagram showing intensity of output of AFM source and definitions of the amplitude modulation parameters

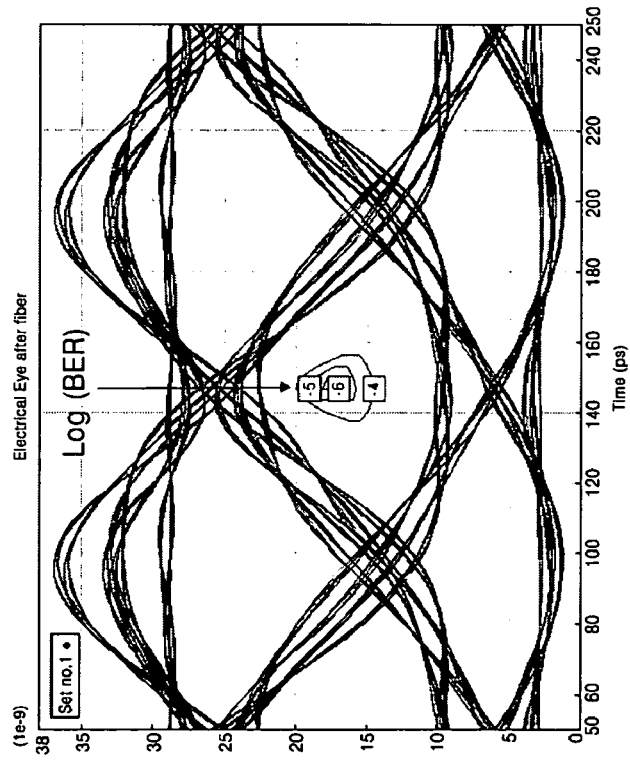
FIG. 12. Eye after 100 km for Pure intensity modulation (Prior art)

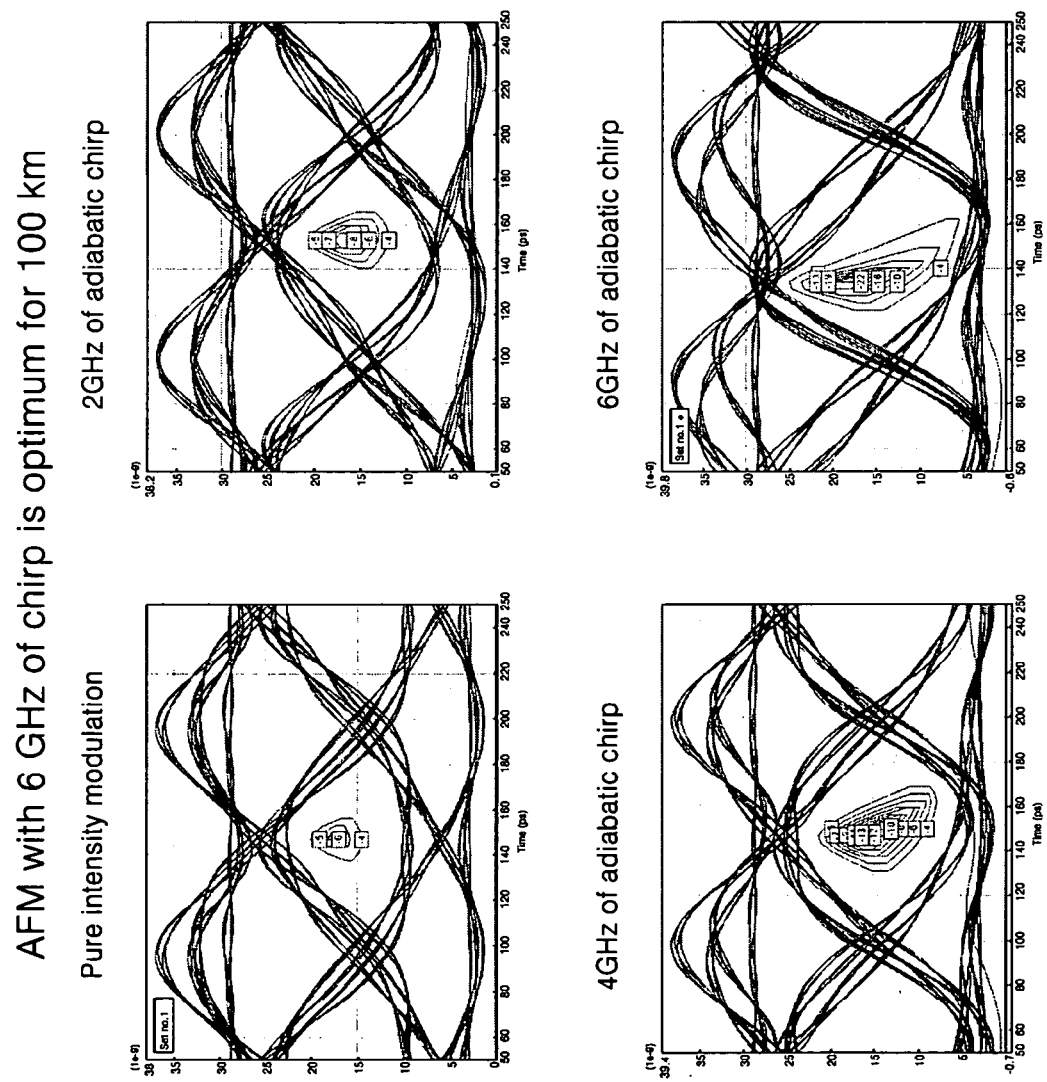
FIG. 13. Eye after 100 km for an AMF source with various values of adiabatic chirp and no transient chirp

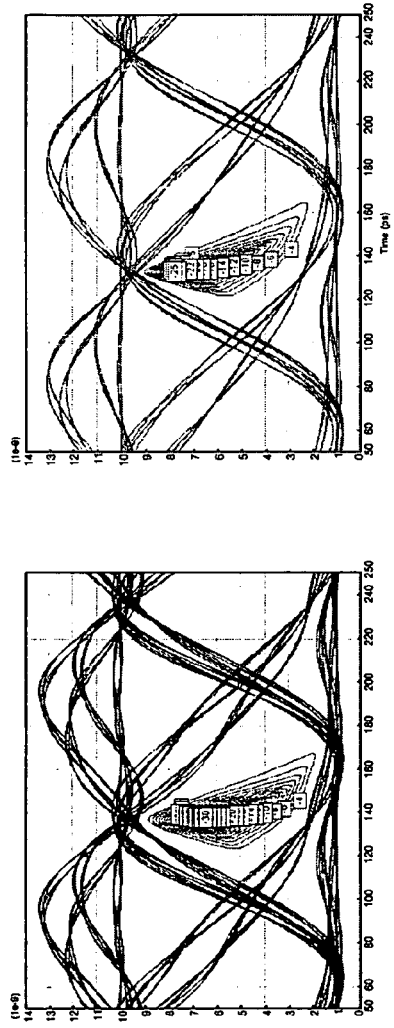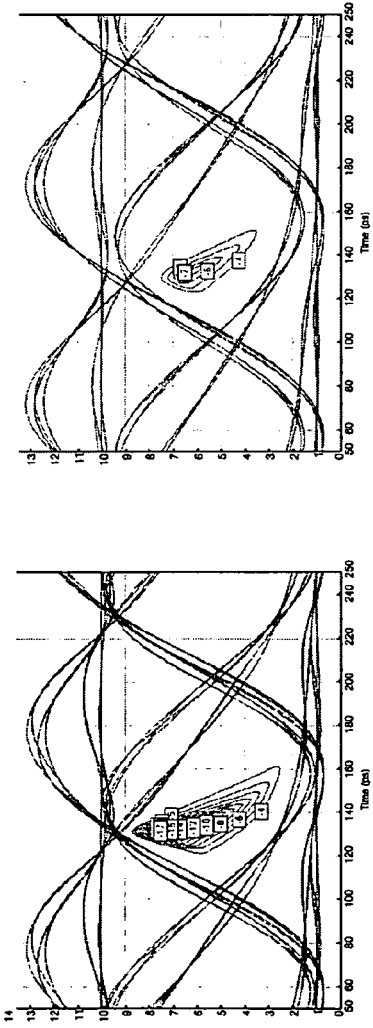
FIG. 14. Eye diagrams showing that changing rise fall times can be used to optimize the BER after fiber propagation.

CARRIER SUPPRESSION USING ADIABATIC FREQUENCY MODULATION (AFM)

REFERENCE TO PENDING PRIOR PATENT APPLICATIONS

This patent application:

(i) is a continuation-in-part of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of prior U.S. patent application Ser. No. 10/680,607, filed Oct. 6, 2003 now U.S. Pat. No. 7,054,538 by Daniel Mahgerefteh et al. for FLAT DISPERSION FREQUENCY DISCRIMINATOR (FDFD); and (iv) claims benefit of pending prior U.S. Provisional Patent Application Ser. No. 60/536,929, filed Jan. 16, 2004 by Yasuhiro Matsui et al. for CARRIER SUPPRESSION USING ADIABATIC FREQUENCY MODULATION (AFM).

The four above-identified patent applications are hereby incorporated herein by reference.

BRIEF DESCRIPTION OF THE DRAWINGS

This and other objects and features of the present invention will be more fully disclosed or rendered obviously by the following detailed description of the preferred embodiments of the invention, which is to be considered together with the accompanying drawings wherein like numbers refer to like parts and further wherein:

FIG. 1 illustrates a spectrum of pure AM modulation;

FIG. 2 illustrates a specter of AM modulation with transient chirp;

FIG. 3 is a graph plotting the intensity and frequency of a ACAM signal over time;

FIG. 4 illustrates a spectrum of an AFM signal;

FIG. 5 illustrates a spectrum of an AFM signal with delay between AM and FM;

FIG. 6 illustrates a system configuration for AFM;

FIG. 7 illustrates a range of adiabatic chirp values for which reflected power is suppressed due to SBS;

FIG. 8 shows a spectrum which illustrates that a carrier is not suppressed for a 10 GHz/NRZ modulation and a 10 GHz of chirp;

FIG. 9 is a graph company g the reflected power, induced by SBS, as a function of launched power into a 100 km length of standard fiber for a CW source without modulation (worse case), 10 Gb/s amplitude modulated source with transient chirp, and an adiabatically chirped amplitude modulated source (ACAM);

FIG. 10 illustrates a typical system configuration with AFM source, fiber, standard intensity modulation receive and decision circuit;

FIG. 11 is an optical eye diagram showing the intensity of output of AFM source and definitions of the amplitude modulation parameters;

FIG. 12 is an eye diagram after 100 km for pure intensity modulation;

FIG. 13 is four eye diagrams after 100 km for an AFM source with various values of adiabatic chirp and no transient chirp; and FIG. 14 is four eye diagram s which illustrate that the changing rise fall times can be used to optimize after fiber propagation.

DESCRIPTION OF THE INVENTION

In fiber optic communication systems the transmitter and receiver are far apart, and that there is no optical amplifier between the two. For example, in festoon applications, the fiber link is under sea, and connects two nearby islands, or two coasts on the same continent. In this case, adding optical amplifiers in the middle of the fiber span is not economical. In order to have enough optical power at the receiver for an acceptable bit error rate (BER), it is therefore necessary to launch a higher optical power to compensate for the entire fiber loss at once. However, the maximum launch power is limited by Stimulated Brillouin scattering (SBS), which causes the injected light to reflect back into the source when the launch power exceeds a certain threshold value, called the SBS threshold. The SBS threshold for an optical fiber is defined as the minimum power in a single frequency, continuous wave optical signal that can cause significant SBS-induced back reflection into the source.

The main seed for starting the SBS process is the optical carrier of the signal, which is a discrete frequency and carries no information. Hence techniques for suppression of the optical carrier increase the SBS threshold. Conventional techniques for carrier suppression are complicated and require double modulation and external $LiNbO_3$. Here we demonstrate that an adiabatically chirped amplitude modulated signal (ACAM) has suppressed carrier over a range of chirp values. In addition this technique reduces overall bandwidth of the signal and makes it more tolerant to fiber dispersion. In the ACAM scheme the optical frequency of the carrier is modulated in time such as to follow the amplitude modulation profile. One example of an optical source to generate a ACAM signal is described in U.S. patent application Ser. No. 10/289,944 filed Nov. 6, 2002, which we now call a Chirp Managed Laser (CML™). Further improvements of the CML™ are described in U.S. patent application Ser. No. 10/680,607, Filed Oct. 6, 2003, entitled flat dispersion frequency discriminator (FDFD), and U.S. patent application Ser. No. 10/308,522 Filed Dec. 3, 2002, entitled high speed transmission system comprising a coupled multicavity optical discriminator, incorporated here by reference. The CML™ generates an ACAM signal by directly modulating a distributed feedback (DFB) laser diode to generate an amplitude modulated signal with finite extinction ratio 0–7 dB. The resulting signal has a low amplitude modulation depth, but significantly, it has a concomitant frequency modulation, which has the same profile as the amplitude modulation. The DFB is biased high above threshold so as to reduce transient chirp. An optical spectrum reshaper, also sometimes called an optical discriminator, then increases the extinction ratio to >10 dB, to produce an adiabatically chirped amplitude modulated signal.

A purely amplitude modulated optical signal at any bit rate, here 10 Gb/s for example, has discrete frequency components at the carrier frequency. Discrete frequency components are narrow-line width spikes in the spectrum, which carry optical power, but have no modulation, or information. Depending on pulse shape, an amplitude modulated signal can also have discrete components at the modulation frequency, here 10 GHz, and its harmonics. FIG. 1 shows an example of such a spectrum. The SBS threshold for a modulated signal is determined by the optical power contained in any 20 MHz slice of its spectrum. (20 MHz is the gain bandwidth of SBS, which depends somewhat on the optical fiber), When the signal is propagated through an optical fiber with high optical power (typically >10 dBm), SBS can cause excess loss as well as interference noise. For a purely amplitude modulated signal, the discrete carrier component, carries a significant fraction of the total optical power in the signal and can reach the SBS threshold, limiting the maximum launch power.

Addition of transient chirp, typically applied in 80 km and longer distance applications for reducing the dispersion penalty, does not remove the carrier, but only broadens the spectrum, as shown in FIG. 2. The spectral broadening reduces the SBS threshold somewhat but the carrier remains, still limiting maximum launch power.

In an embodiment of the present invention, a method for suppressing the optical carrier is to generate an adiabatically chirped amplitude modulated signal (ACAM). We define an ACAM signal as one in which the optical carrier frequency of the source is modulated to have the same profile, as a function of time, as the intensity modulation profile. FIG. 3 shows an example of such a modulated signal. There may be a slight phase delay between the frequency modulation and the amplitude modulation. Since the carrier frequency is modulated simultaneously and synchronously with the amplitude modulation, it is clear that the carrier will not be discrete and its energy will be spread across the spectrum; hence leading to the suppression of the discrete carrier component.

FIG. 4 shows an example of the optical spectrum of an AFM signal with 13 dB extinction ratio at a bit rate of 10 Gb/s, and having an adiabatic chirp of 7.5 GHz. Adiabatic chirp is defined as the maximum frequency excursion in the frequency profile, between the 1 and 0 bits, as shown in FIG. 3. As mentioned above, there may be a phase delay between the frequency modulation and the amplitude modulation. However, this does not affect the carrier suppression property of the AFM. Such a phase delay occurs in the CML™ due to the laser dynamics.

FIG. 5 shows an example of a 10 Gb/s modulated signal with 7.5 GHz of adiabatic chirp and a 20 ps delay between AM and FM. Note that the carrier is still suppressed even in the presence of phase delay.

The carrier is suppressed for a range of adiabatic chirp values. However, it is not suppressed when adiabatic chirp equals the modulation rate (for example, at an adiabatic chirp value of 10 GHz for a 10 Gb/s data rate). FIG. 6 shows the system configuration used in our simulation to demonstrate that Stimulated Brillouin scattering (SBS) is indeed suppressed for an AFM optical signal. In this example, the amplitude and frequency modulation steps for generation of the AFM are performed in two separate, optical modulators.

FIG. 7 shows the calculated transmitted power of a 10 Gb/s digital signal through 100 km of standard fiber, and reflected powers from the fiber, induced by SBS, for a launch power of ~9 dBm. This power is above the SBS threshold for the fiber used in the calculation, and is, therefore, expected to generate SBS. As SBS occurs the transmitted power is reduced nonlinearly, part of the light reflecting back into the source. Modulation of carrier frequency, to generate adiabatic chirp, reduces SBS induced transmission loss as well as the reflected optical power for a range of adiabatic chirp values between 3 GHz to 7 GHz for a 10 Gb/s digital signal. (i.e. for a range of adiabatic chirp between 30% and 70% of the bit rate frequency). Significantly, the carrier is present for adiabatic chirp values near 0 GHz, corresponding to no adiabatic chirp, as well as values near 10 GHz of chirp for a 10 Gb/s optical digital signal.

A key realization of the present invention is that carrier is suppressed for a range of adiabatic chirp values, but remains when the adiabatic chirp is the same as, or near the modulation frequency. As an example, FIG. 8 shows that for a 10 Gb/s NRZ signal the carrier is not suppressed for a 10 GHz adiabatic chirp. This confirms the finding shown in FIG. 7 that SBS is not suppressed at a 10 GHz of adiabatic chirp for a 10 Gb/s NRZ signal.

FIG. 9 compares the reflected power, induced by SBS, as a function of launched power into a 100 km length of standard fiber for a CW source without modulation (worse case), a 10 Gb/s amplitude modulated source with transient chirp, and an adiabatically chirped amplitude modulated source (ACAM). The use of adiabatic chirp allows the launch of >15 mW of power with minimal loss due to SBS. It is therefore an embodiment of the present invention to use an ACAM source with high optical power for a fiber optic transmission system such as a 150 km (2400 ps/nm) link without midline amplification. The adiabatic chirp may be adjusted to reduce the SBS threshold as well as obtain a desired dispersion penalty. In the example shown above the optimum adiabatic chirp for a 10 Gb/s signal is around 5 GHz+/−2 GHz.

Another advantage of an ACAM source is its enhanced tolerance to fiber dispersion. For the purposes of this invention, tolerance to dispersion indicates that the transmitted optical signal has little degradation after propagation through a fiber with dispersion. Fiber degradation is measured by the bit error rate at the receiver. FIG. 10 shows a typical system configuration, where importantly, the receiver is a standard one used in NRZ amplitude modulation schemes. In this case the 1 and 0 bits are distinguished by the integrated energy during a bit period as determined by a decision circuit. The output intensity eye diagram of the ACAM transmitter is also has the same characteristics as a pure amplitude modulated signal generated by a standard intensity modulation transmitter.

The key to the present invention is the concomitant frequency modulation of the carrier, which is adapted to be synchronous with the intensity modulation profile, albeit with a possible phase delay. The optical electric field of an ACAM signal can be described mathematically as follows:

$$E(t) = P_0^{1/2} A(t) \exp(i\phi(t) + \phi_0) \quad (1)$$

where $$\frac{d\phi}{dt} = f_{AD}\left(A(t) - \int_{-\infty}^{+\infty} A(t')dt'\right) \quad (2)$$

Here A(t) is the amplitude modulation, $P_0$ is the average optical power, $\phi$ is time varying phase and $f_{AD}$ is maximum frequency excursion, also called the adiabatic chirp, and $\phi_0$ is a constant phase shift. The amplitude modulation could be non-return-to-zero (NRZ) or return to zero (RZ). For an ideal NRZ pattern, the pulse shapes are square waves with short rise time and fall times. Another embodiment of the present disclosure is that in order to benefit from a dispersion tolerance, the rise time and fall time of the intensity pattern have to be within a certain range.

The amplitude modulation for an NRZ signal is typically displayed as an eye diagram. The amplitude modulation as measured by a sampling scope has a rise time, a fall time, and an extinction ratio (ER), as defined in FIG. 11. The extinction ratio is the ratio of the optical power in the 1s rails to that in the 0s rail. For an ACAM source in a fiber optic system, the bit error rate is minimized by optimizing the rise time, the fall time, and the extinction ratio, as well as the adiabatic chirp of the ACAM source. The range of optimum values also depends somewhat on the propagation distance, which determines the total fiber dispersion. Optimization of the rise time, fall time and ER for an AFM source is therefore a key feature of the present invention disclosure.

The following calculated eye diagrams are an example of optimization of the transmitter parameters for a 100 km (1600 ps/nm) fiber and a bit rate of 10 Gb/s. The eye diagrams are calculated after 100 km of fiber. The contour plots show the log (BER). Note that the desired BER for a communications system is $<10^{-12}$, hence a $<-12$ value. FIGS. 12 and 13 show that the ACAM source at 10 Gb/s and 6 GHz chirp, for this example, shows a much lower BER, implying the dispersion tolerance of an ACAM source. The rise times and fall times of the ACAM output pattern can be adjusted to reduce the BER after fiber transmission. The rise times and fall times can also affect the BER. FIG. 14 is an example in which the rise times and fall times are varied between 20 ps and 70 ps. The contour maps show the optimum BER is obtained for a 20 ps rise time and fall times.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method for suppression of the optical carrier of an optically modulated digital signal, comprising of the steps of:

modulating the amplitude of an optical carrier with digital input data to generate an amplitude modulated optical signal; and modulating the frequency of the optical carrier of the resulting optical signal with the same digital input data, wherein the maximum frequency excursion of the optical carrier is between 30% and 70% of the bit rate frequency of the digital signal.

2. A method for suppression of the optical carrier of an optically modulated digital signal, comprising of the steps of:

modulating the amplitude of an optical carrier with digital input data to generate an amplitude modulated optical signal; and modulating the frequency of the optical carrier of the resulting optical signal with the same digital input data, wherein there is a phase delay between the amplitude profile and frequency profile of the resulting optical signal.

3. A method for suppression of the optical carrier of an optically modulated digital signal, comprising of the steps of:

modulating the amplitude of an optical carrier with digital input data to generate an amplitude modulated optical signal; and modulating the frequency of the optical carrier of the resulting optical signal with the same digital input data, wherein the rise time and fall time of the amplitude profile are adjusted to reduce the bit error rate after transmission of the signal through a length of dispersive fiber to a desired value.

4. A method for suppression of the optical carrier of an optically modulated digital signal, comprising of the steps of:

modulating the amplitude of an optical carrier with digital input data to generate an amplitude modulated optical signal; and modulating the frequency of the optical carrier of the resulting optical signal with the same digital input data, wherein the rise time and fall time of the amplitude profile, the rise time and the fall time of the frequency profile, and the adiabatic chirp are adjusted to reduce the bit error rate of the transmitted signal after propagation through an optical fiber.

* * * * *